April 25, 1944.  H. ULFFERS  2,347,582
SYSTEM FOR PRODUCING POLARIZED LIGHT OF
PREDETERMINED VIBRATORY CONDITION
Filed April 22, 1940   2 Sheets-Sheet 1

Inventor:
Heinz Ulffers
Attys.

April 25, 1944.   H. ULFFERS   2,347,582
SYSTEM FOR PRODUCING POLARIZED LIGHT OF
PREDETERMINED VIBRATORY CONDITION
Filed April 22, 1940   2 Sheets-Sheet 2

Inventor
Heinz Ulffers

Patented Apr. 25, 1944

2,347,582

UNITED STATES PATENT OFFICE 2,347,582

SYSTEM FOR PRODUCING POLARIZED LIGHT OF PREDETERMINED VIBRATORY CONDITION

Heinz Ulffers, Dresden, Germany; vested in the Alien Property Custodian

Application April 22, 1940, Serial No. 330,963
In Germany April 26, 1939

2 Claims. (Cl. 88—65)

The invention relates to a system of producing polarized light of predetermined vibratory condition.

It is an object of the invention to produce a polarizing system permitting of selective orientation of the vibratory plane due to the cooperation of a plane polarizer with a plurality of birefringent elements whose planes of vibration are angularly related to that of the plane polarizer and to each other.

Another object of the invention is to produce a polarizing system avoiding the necessity of utilizing relatively expensive birefringent elements or double refraction elements of a restricted areal capacity only.

The invention also has the object of providing a polarizing system which permits of wide adjustability of the elements of which it is composed, thereby permitting light of non-uniform greatly varying wave length to be polarized to vibrate in a selected plane or form, and also permitting light of uniform wave length to be constrained to a certain predetermined vibratory condition.

With these and numerous other objects in view the invention is described in detail in the following specification in which reference is made to the accompanying drawings.

Figure 1:
Fig. 1 is a diagrammatic side elevation of an assembly of light polarizing elements.

Systems of producing polarized light of predetermined vibratory condition are known. It is known, for instance, to produce light of circular polarization by passing the beam of light to be polarized through a Nicol prism or through a Glan-Thompson prism and disposing in alignment with said polarizing prisms a crystal plate adapted to produce a double refraction of the light, as for instance, a plate of fluorspar, quartz or the like. The first of the polarizing elements, namely the plane polarizer in the form of the Nicol prism or Glan-Thompson prism, is positioned relatively to the second polarizing or birefringent element, so that the polarizing plane of said plane polarizer is at an angle of 45 degrees with both of the main vibratory planes of the element producing the double refraction of the light. The thickness of this plate or crystal producing the double refraction must then be such that the phase difference of the two components vibrating in the main planes of vibration of the light, which issues in plane polarized condition from the polarizing prism, is one-fourth of the wave lengths of said light or a whole odd number multiple of one-fourth wave length.

Now, this condition of establishing a phase difference of one-fourth of the wave length (or an odd whole multiple of one-fourth generally) can be met for a certain wave length only, and hence, the serial arrangement described above of Nicol-prism combined with the birefringent crystal will circularly polarize light of this predetermined wave length only, and light of any different wave length will be polarized elliptically approaching more or less the circular polarization, and in exceptional cases will even again lead to plane polarization.

Systems of this type might well produce elliptically polarized light with an "ellipse of vibration" of a selectively predetermined configuration. For this purpose the same arrangement may be used as described for the production of circularly polarized light. But the angle between the vibratory plane of the plane polarizer and the main vibratory planes of the double refracting crystal or plate is varied, or the thickness of the crystal or plate is varied, or both of these factors may be varied in a predetermined way. The embodiments described below are discussed preferably with reference to circular polarizers. The embodiments, however, can be applied with the variations indicated herein to constitute elliptic polarizers.

With the described arrangement for producing polarized light of predetermined vibratory condition, it is feasible to produce greatly restricted fields only of circular polarization, otherwise the costs of the polarizing prisms become excessive. Furthermore, for many purposes, these particular polarizers are not readily employable owing to their unfavorable ratios of their cross-section to the length thereof. Within recent times, plane polarizers have gone into use consisting either of thin layers of individual crystals of dichroitic substances, or consisting of thin foils of a suitable carrier material into which dichroitic crystals are embedded.

It has already been stated that the double-refracting crystals or plates of substantial area are expensive and hard to obtain. They also have now been replaced by foil material made of other suitable substances but also having the quality of producing a double refraction of the light. An example of these substances is "Cellophane" (registered trade-mark).

The difficulty in the use of these polarizing foils is that the substances upon being placed under tension during the manufacture of the polarizers, or on being placed under tension while being manipulated in use, are physically modified so as to become optically anisotropic. Hence, they cannot readily be produced on a commercial scale with sufficient accuracy to maintain a selectively determined phase difference of vibration.

According to the present invention, these difficulties are avoided by combining the plane polarizer preferably with two birefringent foils of different orientation with reference to the main vibratory directions, instead of combining them with a single foil having the quality of producing double refraction. Each one of the foils having double refraction may then lead to a phase difference which varies considerably from that value which it is desired to maintain. This desired value is that value which would theoretically be induced upon employing a single thickness of birefringent polarizing material of a type producing main-vibratory directions at an angle of 45 degrees with the polarizing direction of the plane polarizer.

The phase differences induced by double refraction foils are dependent upon the wave length of the light employed. Utilizing this condition, the present invention disposes the two serially arranged birefringent foils in such manner relatively to each other that they are adjustable together with respect to the plane polarizer, and also are adjustable relatively to each other. In this manner it will become feasible within certain limits to attain a predetermined vibratory condition, as for instance, circular polarization when utilizing monochromatic light of any desired wave length, and it will also be feasible to obtain a desired vibratory condition—circular or non-circular polarization—upon utilizing a light of any predetermined wave length.

Wherever the polarized light may slightly deviate from the desired vibratory condition (angle of polarization), it will suffice either to leave the relative position of the two birefringent foils unaltered and to adjust them together with respect to the plane polarizer, or it will suffice to leave the position of one of the birefringent fraction foils relatively to the plane polarizer unaltered while adjusting solely the second one of these birefringent elements. In the first case, where the combination of the two birefringent foils is to be adjusted with respect to the plane polarizer, these foils may be conjointly mounted in a single support which is adjustable relatively to the plane polarizer. The preferred way is to leave the relative position of the two birefringent foils with respect to each other unaltered and to adjust them together relatively to the plane polarizer.

The above adjustabilities are to be used whenever light of unspecified wave length is to be polarized to set up vibration in a predetermined vibratory plane, as for instance for circular polarization.

When, however, monochromatic light of a certain selected wave length is to be converted to circularly polarized light, it is advisable to leave the position of the two birefringent polarizer foils with respect to each other unaltered and also to leave unaltered their position with respect to the plane polarizer. In that case the plane polarizing filter and the combination of birefringent foils will produce the desired polarization of the light of single wave length and it may be advisable to support the polarizers in fixed position in a common mount in which they may be cemented in place.

It is also within the scope of the present invention to provide a system in which a plane polarizer is united at each side thereof with a pair of birefringent foils, and each of these pairs of foils may be set to be operative for a certain wave length. The wave length in the two pairs being different from each other, the circular polarization of light of two different wave lengths may be effected depending upon the side of the system directed towards the incident light.

Furthermore, any circular polarizer comprising a plane polarizer and on one side of the plane polarizer a pair of birefringent foils may obviously be utilized as an ordinary plane polarizer by letting the birefringent combination "face" the light to be polarized. This light will then first pass through the pair of birefringent foils to pass after double refraction into the plane polarizer and to issue from the same as plane polarized light.

Fig. 1 shows a plane polarizer 1 in the form of a plate or layer and two foils 2 and 3 each of a plate or layer having a double refractive action. The last named foils may, for instance, be made of "Cellophane" (registered trade-mark).

Figure 2:
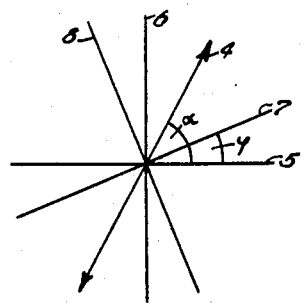
Fig. 2 is a diagram showing the angular relation of the planes of vibration.

Fig. 2 illustrates diagrammatically the angular relation of the main components of the vibratory movement.

It shows the position of the main directions of the vibratory movement, as influenced by double refraction with respect to the direction of the plane in which the light passing through the plane polarizer vibrates.

The straight line 4 may indicate the direction of vibration of the plane polarized light, as for instance, due to the plane polarizer 1 of Fig. 1. The two main directions of vibration of the birefringent foil 2, Fig. 1, are indicated in Fig. 2 at 5 and 6. The main vibratory directions of vibration of the birefringent foil 3, Fig. 1, are indicated in Fig. 2 at 7 and 8. The angle between the plane of vibratory movement induced by the plane polarizer 1, and indicated at 4, Fig. 2, and one of the main vibratory directions set up by the birefringent foil 2, as for instance, the vibratory direction 5 induced by said foil 2 is indicated at $a$, the angle between two main components of vibratory movement of the two birefringent foils 2 and 3, Fig. 1 is indicated at $\varphi$ between the directions 5 and 7.

Figure 3:
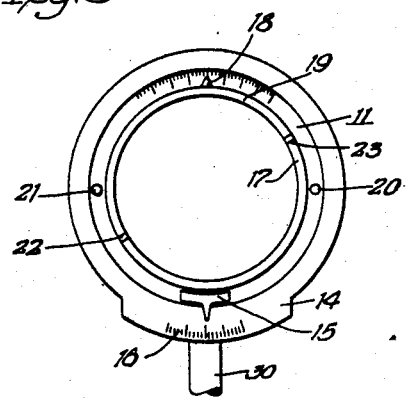
Fig. 3 is a front elevation of polarizing elements supported in a common mount.
Figure 4:
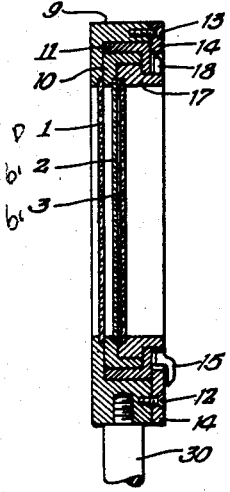
Fig. 4 is a vertical central section of the same.

Figs. 3 and 4 now illustrate in front elevation and section, respectively, an embodiment of the system of the present invention. In this system, the two double refraction foils 2 and 3 are adjustable relatively to each other and are also adjustable relatively to the ordinary polarizer 1. This implies with reference to the diagram shown in Fig. 2 that in this system (Figs. 3 and 4), the angle $a$ as well as the angle $\varphi$ are selectively variable and adjustable.

As shown in Fig. 4, the system comprises an annular housing 9 which serves for rigidly supporting the plane polarizer 1. The ring mount 10 within housing 9 contains the double refraction foil 2. To this foil mount 10 is fixedly secured by means of screws or the like a ring 11. The foil mount 10 and the ring 11 are jointly rotatable in engagement with the annular housing 9. The ring 11 and, therefore, also the foil mount is held against displacement in axial direction with respect to the annular housing 9 by means of an annular retainer 14 fixed to the annular housing 9 by means of screws 12 and 13. The ring 11 secured to the foil mount 10 of the foil 2 is provided with a pointer 15 in fixed position thereon to indicate the adjustment of said double refraction foil 2 relatively to the plane polarizing filter 1. For this purpose the pointer 15 is movable over an arcuate dial 16 forming a part of or being secured to the housing 9 by being applied to that retaining ring 14 which is fixed to the housing 9. The second mount 17 serves for holding fixedly therein the second double refraction foil 3. This mount 17 is of such configuration that it is held against axial displacement with respect to the housing 9 and with respect to the first foil mount 10 by means of the ring 11. The second foil mount 17 also is equipped with a pointer 18 fixed thereto and adapted to indicate the relative adjustment of the two foils 2 and 3 owing to its cooperation with an arcuate dial 19 fixed to the ring 11.

The calibration of the arcuate dials 16 and 19 may, for instance, be a calibration in angular degrees. Where it is desired, however, to utilize an embodiment of this character for polarizing light of a certain wave length only to vary the condition of restricted vibration, the dials 16 and 19 may well be calibrated to indicate the varying phase differences. It is also feasible to calibrate these dials to indicate other values indicating variable vibratory conditions. If, on the other hand, this embodiment is to be utilized for the production, from light of non-uniform wave length, of polarized light of unvariable vibration, as for instance, for circular polarization, or for elliptic polarization of a certain elliptic shape, the dials 16 and 19 may be calibrated in wave length units since the vibratory condition will remain uniform.

In use, the embodiment illustrated in Figs. 3 and 4 will be adjusted in accordance with the desired vibratory condition and/or with the desired wave length of the polarized light by making use of a setting key (not shown). The ring 11 for the foil mount 10 of birefringent foil 2 is provided with sockets 20, 21, and the foil mount 17 for the other foil 3 is provided with notches 22 and 23. Upon the insertion of suitable projections on the setting key into these sockets 20, 21 and/or into the grooves or notches 22, 23, the two foils may be adjusted relatively to the polarizer 1 as well as relatively to each other in such manner that the pointers 15, 18 indicate on the pertaining dial 16 and 19 respectively the desired values.

Figure 5:
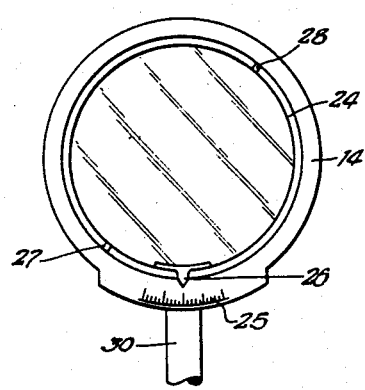
Fig. 5 shows similar to Fig. 3 a front elevation of a modified arrangement.
Figure 6:
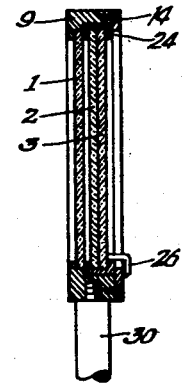
Fig. 6 is a central vertical section of the same.

In the embodiment illustrated in Figs. 5 and 6, the two birefringent foils 2 and 3 are mounted conjointly within an annular mount 24. Axial displacement of this annular mount with respect to the housing 9 is again prevented by the retaining ring 14 secured fixedly to the housing 9. In this embodiment the relative adjustment of the combined birefringent foils 2 and 3 with respect to the polarizing filter 1 may be ascertained from the position of the pointer 26 fixedly secured to the foil mount 24 with respect to an arcuate dial 25 which forms a part of or is fixedly secured to the housing 9. This dial 25 also may be calibrated either in angular degrees or—when working with a predetermined wave length—it may be calibrated to indicate different phase displacements, or where the phase displacement is to remain unaltered, the dial may be calibrated to indicate different wave lengths. In this embodiment, therefore, the foil mount 24 with the two double-refractive foils 2 and 3 may be adjusted with respect to the housing 9 and the plane polarizer 1 fixedly mounted therein by means of a key, not shown, but having short projections for entering the notches 27, 28 in the end face of the foil mount 24.

Since the arrangement described herein may particularly be used for producing monochromatic light of predetermined polarized condition, it is advisable to select for the annular housing 9, a shape which will selectively permit the attachment of a color filter to the same. Obviously also any of the foils of the system may be dyed to attain a color filter effect. If as source of light metal vapor lamps are to be employed, it is recommended to use as color filter preferably the so-called monochromatic filters which permit the passage of that light only which is associated with a certain emitting line in the spectrum of the light of the metal vapor lamp.

It is also advisable to provide the housing 9 with some support 30 permitting the entire arrangement to be turned readily about an axis at right angle to the direction of the light.

It is again obvious that the invention is not described solely to the production of circular polarized light or elliptically polarized light. It is obvious that for instance the plane polarizers shown in the various embodiments may be omitted. In that case, the invention will utilize a pair of birefringent layers or foils having a predetermined phase displacement, as for instance a displacement of one-half wave length.

It is then possible by means of this assembly of birefringent polarizers to rotate the vibratory plane of a plane polarized light 90 degrees. It is, furthermore, possible by this last mentioned arrangement to utilize birefringent layers for the production of what is termed "red of primary degree" as utilized for testing tensions.

I claim:

1. In a system for producing polarized light of selectively determined vibratory condition from a beam of unpolarized light, the combination of a support, polarizing means fixed on said support in the path of said beam for transmitting a component of said beam as plane polarized light, a pair of axially aligned birefringent members each formed of thin transparent foil material, means for mounting said birefringent members on said support whereby either member is rotatable about said axis relative to the other member and whereby both members are conjointly rotatable about said axis, said birefringent members being positioned in alignment with said polarizing means to intercept polarized light and to act as wave retardation means in accordance with their orientation with respect to each other and to said polarizing means, and separate scale means and pointer means associated with each birefringent member for indicating the relative angular position between the main vibratory axes of the two birefringent members and the relative angular position between the main vibratory axes of one of the birefringent members and the polarizing means whereby to permit the selective orientation of the polarizing means and the birefringent members with respect to each other to obtain a predetermined vibratory condition of the light transmitted by said system.

2. In a polarizing device for producing polarized light of predetermined vibratory condition and having polarizing means arranged to intercept light from an unpolarized light source and to transmit polarized light, the combination of a housing, a plane polarizer fixed in one end of said housing in a position to intercept said unpolarized light and to transmit plane polarized light, birefringent members each formed of thin transparent foil material, mounting means for rotatably supporting said birefringent members within said housing whereby each birefringent member may be adjustably rotated relative to the other and whereby both birefringent members may be rotated together, said birefringent members being rotatable about a common axis and being aligned with said polarizer to receive the polarized light transmitted through the polarizer, the birefringent members acting as wave retardation means in accordance with their orientation with respect to each other and with respect to the polarizer, and pointer means carried by each birefringent member and separate scale means for each pointer means, one scale means being carried by said housing and the other scale means being carried by one of said birefringent members whereby an indication of the orientation of said birefringent members with respect to each other is given by one of said pointers and scale means and an indication of the orientation of one of said birefringent members with respect to said polarizer is given by the other pointer and scale means.

HEINZ ULFFERS.